(12) United States Patent
Hauke et al.

(10) Patent No.: US 7,599,531 B2
(45) Date of Patent: Oct. 6, 2009

(54) METHOD AND ARRANGEMENT FOR OPTICAL RECORDING OF BIOMETRIC FINGER DATA

(75) Inventors: Rudolf Hauke, Niederstotzingen (DE); Gerhard Paar, Graz (AT); Guiseppe Parziale, Grottaglie (IT)

(73) Assignee: TBS Holding AG, Pfaeffikon (CH)

( * ) Notice: Subject to any disclaimer, the term of this patent is extended or adjusted under 35 U.S.C. 154(b) by 696 days.

(21) Appl. No.: 11/209,604

(22) Filed: Aug. 23, 2005

(65) Prior Publication Data

US 2006/0233427 A1    Oct. 19, 2006

(30) Foreign Application Priority Data

Aug. 24, 2004    (DE)    ........................ 10 2004 041 115

(51) Int. Cl.
*G06K 9/00*    (2006.01)
(52) U.S. Cl. ........................................ 382/124; 382/115
(58) Field of Classification Search ................ 382/115, 382/116, 119, 120, 124, 125, 126, 154; 356/71; 340/5.53, 5.83; 713/186
See application file for complete search history.

(56) References Cited

U.S. PATENT DOCUMENTS

| | | | | |
|---|---|---|---|---|
| 5,963,664 | A * | 10/1999 | Kumar et al. | 382/154 |
| 6,404,904 | B1 | 6/2002 | Einighammer et al. | 382/124 |
| 6,466,686 | B2 * | 10/2002 | Senior | 382/124 |
| 7,139,424 | B2 * | 11/2006 | Sogawa | 382/154 |
| 2004/0008875 | A1 | 1/2004 | Linares | 382/124 |

FOREIGN PATENT DOCUMENTS

| | | |
|---|---|---|
| DE | 3424955 | 1/1986 |
| DE | 19516662 | 11/1996 |
| DE | 101 03 622 A1 | 1/2001 |
| DE | 101 23 561 A1 | 10/2001 |
| DE | 101 53 808 A1 | 5/2003 |
| EP | 1 073 988 B1 | 1/2002 |
| WO | WO 99/56267 | 11/1999 |
| WO | WO-0209024 | 1/2002 |

OTHER PUBLICATIONS

Manuel M. Oliveira, Gary Bishop, David McAllister, "Relief Texture Mapping", Computer Graphics Proceedings, Annual Conference Series, 2000, XP-001003575, pp. 359-368, University of North Carolina at Chapel Hill.

Marc Rioux, "Color 3-D Electronic Imaging of the Surface of the Human Body", Autonomous System Laboratory Institute for Information Technology National Research Council Canada, SPIE vol. 2277, XP 00563365, pp. 42-54, Oct. 1994.

David Zhang et al., "Integrated Image and Graphics Technologies", Chapter 8, p. 142, XP-002390949, 2004.

* cited by examiner

*Primary Examiner*—Charles Kim
*Assistant Examiner*—Stephen R Koziol
(74) *Attorney, Agent, or Firm*—Darby & Darby (57) ABSTRACT

A method for acquiring biometric data of a finger a surface to be imaged includes touchlessly and simultaneously imaging a finger surface to be imaged along at least three different directions into digital images, wherein each point of the surface to be imaged is imaged along at least two of the directions and wherein the surface to be imaged extends from a first nail edge across a finger-ball to a second nail edge. Subsequently, a geometric basic model for at least a part of the finger is determined using at least one of the digital images. Pre-warped images are calculated by geometrically pre-warping the digital images using the geometric basic model. Additionally, a three-dimensional model of the surface to be imaged is reconstructed using a stereoscopic analysis of the pre-warped images and at least one finger characteristic is determined using the three-dimensional model.

23 Claims, 6 Drawing Sheets

METHOD AND ARRANGEMENT FOR OPTICAL RECORDING OF BIOMETRIC FINGER DATA

Priority is claimed to German Patent Application DE 10 2004 041 115.8, filed Aug. 24, 2005, the entire disclosure of which is hereby incorporated by reference herein.

The invention relates to a method and an arrangement for acquiring biometric data of a finger.

BACKGROUND

Internationally, the usage of so-called biometric characteristics is postulated increasingly, for example in the US-Visit and European programs.

The aim of these programs is to increase security, for example for airline passengers, and to recognize terrorists as early as possible.

For the acquisition of biometric data preferably characteristics of the face, of the iris and of the finger are used. Because of the high recognition rate and the invariability of the characteristics during the process of aging and because of the distinguishability even for uniovular twins, the characteristics of the finger are especially suited.

Especially for surveillance of persons at a border crossing, the biometric characteristics of a person demanding admittance have to be matched with existing, very large databases which can contain many millions of entries. In doing so, it has to be ensured that the biometric data being deposited in a fraud resistant way on a passport is in accordance with the entering person. As these characteristics have to be identified in a so-called 1:N search out of millions of sets of comparison information, in particular of criminal search databases, in case of finger characteristics a recognition problem of the following type arises:

The smaller the scanned surface of the finger which is to be identified the more inaccurate the results of the 1:N search are, because the number of characteristics, so-called minutiae, is not sufficient for a definite identification. Studies have shown that recognition methods using finger sensors which give only a simple impression of the finger reach a recognition rate of 80% to 85% only, because of the not entirely acquired finger surface. Such methods which are called flat finger impressions are predominantly used in civil areas. For protection against crime a recognition rate that low is insufficient.

Due to this, unrolled fingerprints have always been used in official criminology, where the person to be registered has to dye the fingers first and to roll them onto paper to be able to reproduce the entire surface of the finger from nail to nail.

Newer methods are known, too, where so-called live-scanners are utilized which replace the intricate dyeing, wherein the finger is rolled across a glass plate and the contrast due to a disabled total reflection arising thereof is used for optically imaging by means of a camera. With this method, it is possible to significantly increase the recognition rate of the 1:N identification in large databases to more than 98%.

With this method it is disadvantageous that the person to be registered has to roll the finger on an underlay. Normally, this results in problems with inexperienced users, wherein the fingerprints become smeared. Additionally, because of the different application pressure the fingers can deform differently or yield bad contrasts. Furthermore, it has been observed that, besides of a lack of contrast, in particular in case of dry skin grease marks are left which can also be recognized in a subsequent identification. To avoid this, the registration underlays consisting of glass have to be cleaned after each use as a general rule. Because a supervisor is required for an optimal accuracy, these methods cannot be used reasonably at automated control sites, for example so-called kiosks in the afore mentioned entry programs.

Systems are known that enable to image a finger touchlessly.

For example, it is known from EP 1 073 988 B1 and WO 99/56267 respectively to image a finger touchlessly, wherein the formation of the contrast is based upon exploiting features of polarized light. Thereby, the insufficient light efficiency turns out to be disadvantageous, because the polarization filter prevents an effective usage of the photons and therefore the efficiency factor is low. Furthermore, distortions caused by the imaging process are not compensated and result in the recognition of wrong minutiae very often, which is caused by shadowing to the dermal ridges in the utilized optical path of illumination.

Based on the touchless imaging principle, several techniques are generally known where the unrolled finger, i.e. the surface, can be imaged user-friendly. This includes, for example, DE 101 23 561 A1, DE 101 53 808 A1 and DE 101 03 622 A1.

In DE 101 23 561 A1, a method for identification of persons by means of a three-dimensional analysis of the fingertip is described. However, no method is given how to calculate the three-dimensional model and how to solve the problems of composing the single images to an overall image with sufficient accuracy.

If such a method is to be used for identification of persons at a country's borders, least criteria for the imaging quality, for example FBI Appendix F or similar criteria, have to be fulfilled, and it has to be ensured that the images taken from the dermal ridges are compatible with existing unrolled finger images. It is absolutely necessary to recognize persons on the basis of existing databases, in particular if these have been re-acquired with new optical methods.

In DE 101 03 622 A1, a method for imaging the surface of a finger is described, which reproduces the surface essentially by cylindrical imaging. However, it is disadvantageous that, on one hand, the finger is not illuminated uniformly due to the utilized principle and, on the other hand, that the imaging has very strong distortions, especially if the finger is not located exactly on the optical axis of the cylinder.

The DE 101 53 808 A1 describes another method for touchless optical creation of unrolled fingerprints, at which the image distortions shall be eliminated by creating a sequence of partial images whose overlapping areas are correlated as a structure of orientation by exploiting the pattern of capillary lines. Besides of the intricate realization of this arrangement, with such a method the demanded imaging quality is achievable not at all or only with largest efforts.

From US 2004/0008875 A1, a method for acquiring and processing three-dimensional fingerprints is known, wherein a finger which is arranged in contact with a transparent plate is scanned by means of at least two lasers, wherein the lasers sway along the finger, and a stereoscopic fingerprint image is created from overlapping scan lines and saved. The method exhibits all disadvantages of touching optical fingerprint methods. Additionally, because of the geometric arrangement of the finger on the plate, not the entire surface of the finger nor the entire finger-ball, respectively, can be imaged. Thus, the recognition rate is low. An accurate imaging method is not given in the document.

In the prior art, stereoscopic methods are inherently known. In particular, the Locus method is known, by which height deviations of an imaged body can be determined from stereo image pairs in relation to a geometric model which has to be provided.

In order to create stereo image pairs it is also known to perform a Hierarchical-Feature-Vector-Matching (HFVM) using calculations in image space.

In order to calibrate stereoscopic imaging devices, a method is known by which to determine the contortions and distortions of a stereoscopic imaging arrangement using a specimen.

SUMMARY OF THE INVENTION

It is a task of the invention to specify a method and an arrangement, by which the disadvantages of the known methods for recording and processing of fingerprints are avoided and which can reproduce at least a finger-ball user-friendly and reliable and which enable an increased fraud resistance.

According to the invention, the problem is solved by a method comprising the features given in claim 1 and by an arrangement comprising the features given in claim 19.

According to the invention, for acquiring biometric data of a finger a surface to be imaged is touchlessly and simultaneously imaged along at least three different directions into digital images, wherein each point of said surface to be imaged is imaged along at least two of said directions and wherein said surface to be imaged extends from a first nail edge across a finger-ball to a second nail edge. Subsequently, a geometric basic model for at least a part of the finger is determined using at least one of said digital images. Pre-warped images are calculated by geometrically pre-warping the digital images using said geometric basic model. Additionally, a three-dimensional model of the surface to be imaged is reconstructed using a stereoscopic analysis of the pre-warped images and at least one finger characteristic is determined using the three-dimensional model.

In the solution according to the invention, each point of the surface to be imaged is imaged along two different directions, wherein the surface to be imaged is not touched. This method enables to image the entire surface of a finger that is relevant for a fingerprint, from nail edge to nail edge without contaminations deposited by the skin compromising the imaging process. Furthermore, by imaging each point along two different directions and thus taking images from two different perspectives, a stereoscopic analysis for a high accuracy of the acquisition is possible, wherein the accuracy is significantly improved by a geometric pre-warping. Besides, by simultaneously imaging, errors resulting from a movement of the finger are minimized. In terms of the invention, shutter speeds are considered to be simultaneous if they appear within a particular time window of 20 ms. The invention enables an increased fraud resistance by using a three-dimensional model, because flat imitations are not identified as a finger.

Preferably, the three-dimensional model is reconstructed on the basis of the geometric basic model, wherein a structure of dermal ridges and/or a surface texture of the surface to be imaged is assigned to the three-dimensional model. This allows a fast execution of the method.

The accuracy of the acquisition can be further improved by using cameras for said imaging, wherein aberrations of said cameras are calculationally corrected within the digital images. The resulting images are denoted to be aberration-corrected in the following. The resulting aberration-corrected images can be used instead of uncorrected digital images in all steps of the method.

In a specific embodiment each digital image is filtered in a shading correction, wherein a local contrast is preserved and the digital images' average intensities are normalized. Performing such a correction step, low frequent illumination inconsistencies can be removed from the digital images. The resulting filtered images can be used instead of unfiltered digital images in all steps of the method. A digital image can be both aberration-corrected and filtered.

Advisably, two-dimensional parallaxes for said stereoscopic analysis are determined from pair combinations of the pre-warped images. The parallaxes from the pre-warped images are converted to parallaxes in the image space of the aberration-corrected images using a back-transformation.

In a preferred embodiment at least a part of a solid of revolution having segmentally varying radii along its rotation axis is used for said geometric basic model, wherein the rotation axis and the radii are determined using silhouettes of the finger in at least two different digital images of different imaging directions. Such a geometric basic model can be determined within short time and allows a high accuracy of the acquisition of finger characteristics later on.

A particularly high accuracy of the acquisition of finger characteristics can be achieved by determining height deviations between said geometric basic model of the finger and the finger for said three-dimensional model, the height deviations being orthogonal to a local surface of the geometric basic model. These height deviations can, respectively, supplement or correct the geometric basic model and thus improve its accuracy. However, the height deviations can also serve for representing the three-dimensional model independently of the geometric basic model.

In an advanced embodiment, for said three-dimensional model, a digital or pre-warped grayscale, color or multispectral image of the surface to be imaged is projected onto said geometric basic model corrected by said height deviations. Thus, the flat optical information of the grayscale, color or multispectral image used is combined with the spatial information of the geometric basic model supplemented by the height deviations. This way, more information is available for the acquisition of the at least one finger characteristic, improving its accuracy.

The accuracy of the acquisition can be further improved by performing a selection out of the aberration-corrected images individually for each model image point, optimized for an extraction of minutiae, before said projecting onto the geometric basic model. For this purpose, images of a single image receiver, being taken with different illumination situations, or images of different image receivers can be used. This way, particularly images having the highest contrast can be selected individually for each model image point.

Preferably, said selection out of the aberration-corrected images is performed using a surface normal at a respective point of the surface to be imaged, inner and outer orientations of image receivers as well as using positions, directions of emission and emission cones of light sources.

In an advanced embodiment, the selection out of the aberration-corrected images is performed with texture analyses of the aberration-corrected and, preferably, pre-warped images. By using pre-warped images for the selection, the efficiency of the selection can be improved. Generally, in all steps of the method, instead of aberration-corrected images the corresponding pre-warped images can be used to increase efficiency. Preferably, all pre-warped images are also aberration-corrected and optionally filtered.

It is advantageous to weight light sources that illuminate a surface pixel depending on an angle between an illuminating ray and a surface normal before said selection, wherein a large weight is assigned to aberration-corrected images that exhibit reflectingly incident light at this surface pixel and/or to aberration-corrected images whose direction of illumination and line of vision are in the vicinity of the normal surface. This way, those images having a high contrast can be determined with little effort.

The quality of the three-dimensional model can be improved by using results of several projections of aberration-corrected images onto the three-dimensional model in a weighted combination for each surface point or for a selection of surface points of the three-dimensional model. This weighting can be performed additionally or alternatively to the selection of the optimal aberration-corrected images. Advantageously, this weighting is performed in areas of transitions between one respective pair of image receivers and the next one.

Biometric data are usually acquired for an immediate or future comparison. Therefore, for the at least one finger characteristic to be acquired there are different options available. They are advantageously performed depending on the type of comparison to be carried out.

In a first option for the acquisition of the at least one finger characteristic, a virtual unrolled fingerprint is created as said finger characteristic, the virtual unrolled fingerprint corresponding with said three-dimensional model. Such a virtual unrolled fingerprint can be a flat two-dimensional black and white, grayscale or multispectral image. However, it can also contain additional information concerning the recesses and elevations of the finger's dermal lines as a third dimension of a topography of said surface to be imaged. The third dimension of such a dermal line-and-valley topography can be determined, for example, by assigning auxiliary height deviations according to grayscale levels or colors of a grayscale, color or multispectral image projected onto the three-dimensional model.

For example, a virtual unrolled fingerprint can be created in the form of a two-dimensional or three-dimensional texture, respectively. In this form, it can be compared, for example, to other fingerprints being available in the same form by using correlations.

In a special embodiment, for creating said virtual unrolled fingerprint, the three-dimensional model is converted to a plane area by orthogonally projecting the three-dimensional model onto a profile body and assigning points of said profile body's surface to points of said plane area. As a profile body a half cylinder can be used for example, wherein an arc length of the half cylinder is assigned to a linear coordinate in the plane area. The half cylinder preferably exhibits different radii at different positions. The conversion as a consequence has a higher accuracy.

Preferred is an embodiment in which an unrolling of the three-dimensional model on a plane is simulated. Using such an embodiment, a virtual unrolled fingerprint can be determined from the three-dimensional model with the highest possible accuracy.

A second option for the acquisition of the at least one finger characteristic is to create a virtual unrolled fingerprint corresponding with said three-dimensional model and to derive two-dimensionally classified minutiae as finger characteristics from said virtual unrolled fingerprint. Also in this case such a virtual unrolled fingerprint preferably is a flat, two-dimensional black and white, grayscale or multispectral image. The derivation of the minutiae uses known steps.

In a third option for the acquisition of the at least one finger characteristic, generally a three-dimensional texture can be created as said finger characteristic from said three-dimensional model. Such a not-unrolled three-dimensional texture can be compared to other finger characteristics being available as a three-dimensional texture by correlating them, for example. A time-consuming conversion to an unrolled fingerprint is not necessary in this option.

For a fourth option for the acquisition of the at least one finger characteristic, three-dimensionally classified minutiae are derived as finger characteristics from said three-dimensional model. Three-dimensionally classified minutiae have not been used yet. However, they enable a more precise comparison of two sets of minutiae with a lower probability of a false recognition or an unrecognized imitation. A possible definition for three-dimensionally classified minutiae is introduced in this document.

In a special embodiment the three-dimensional model itself is determined as the finger characteristic. For example, data bases can be built, that directly save the reconstructed data of the three-dimensional model of an acquired fingerprint without any further extraction, manipulation or simplification. These data can be directly compared with each other without risking an information loss by conversion into a different format, for example by extracting minutiae. Also, at a later time, e.g. when new extraction or simplification techniques exist, there is the possibility to apply an extraction or simplification before each comparison to copies of data sets to be compared, without permanently changing the data base content and in doing so potentially reducing the information content. The amount of data that have to be saved is insignificantly larger for the three-dimensional model than that for a two-dimensional record of a fingerprint.

Advantageously, said surface to be imaged is illuminated with different light sources or combinations thereof while performing several passes of imaging. Thus, for each of the imaging directions an adequate illumination situation can be set. The passes of simultaneous imaging are performed in a fast sequence, for example using a recording frequency of 60 Hz. The digital images of different passes are preferably adjusted using an anti-jittering algorithm in order to correct changes in the finger's position between the passes.

An arrangement for acquiring biometric data of a finger according to the invention comprises at least three image receivers located on a virtual arc around a system axis and aiming to said system axis and a control unit. Said control unit thereby performs the method according to the invention in several worksteps, wherein it triggers the image receivers to record the respective digital images. The control unit provides the at least one finger characteristic at an interface after completion of the worksteps. Alternatively or additionally, it can compare the at least one finger characteristic determined before with a data set passed to it and provide the result of the comparison at an interface.

Preferably, the control unit first records checking images by means of said image receivers and monitors a placing of the finger using said checking images and performs the remaining worksteps solely in case of a correct placing. A wrong attitude or an undue movement of the finger, eliminating a correct acquisition of biometric data, is thus ignored.

In preferred embodiment, at least one light source is arranged between next to each image receiver, by means of which said surface to be imaged is illuminatable at least partially, wherein each light source is controllable independently of the others. This enables to illuminate the surface to be imaged in several passes of imaging using different light sources or combinations of light sources.

For a high image quality and thus a high quality of acquisition of biometric data, said light sources are arranged and controllable in such a way, that relevant boundary surfaces of dermal lines of the finger reflect the light emitted by the light sources directly to one of the light receivers.

BRIEF DESCRIPTION OF THE DRAWINGS

The invention is further explained in more detail below considering several examples in the following text with reference to exemplary embodiments in the drawings, in which.

DETAILED DESCRIPTION

Figure 1A:
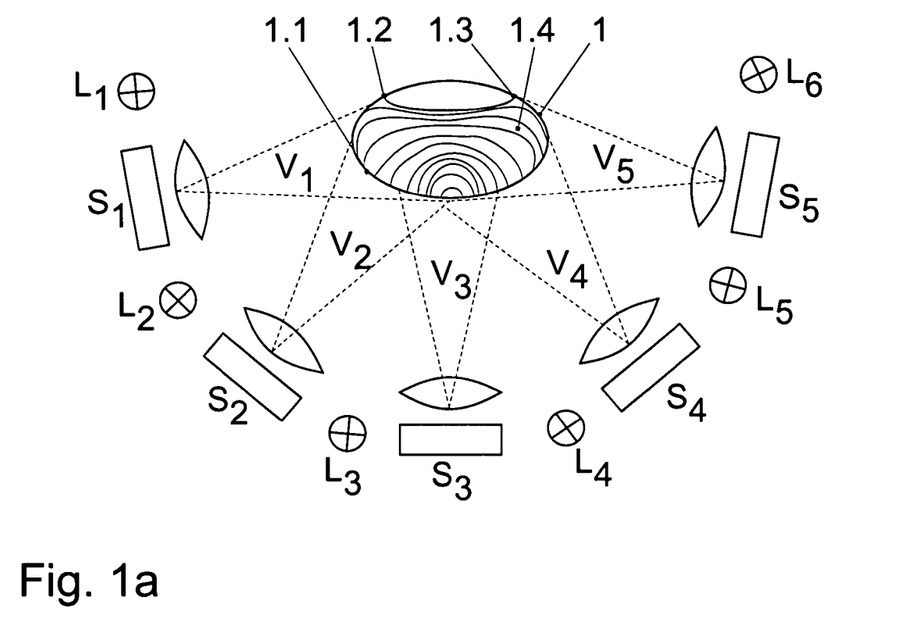
FIG. 1 shows a schematic representation of a finger in an arrangement according to the invention, comprising five sensors and their fields of view in a front view with regard to the finger.
Figure 1B:
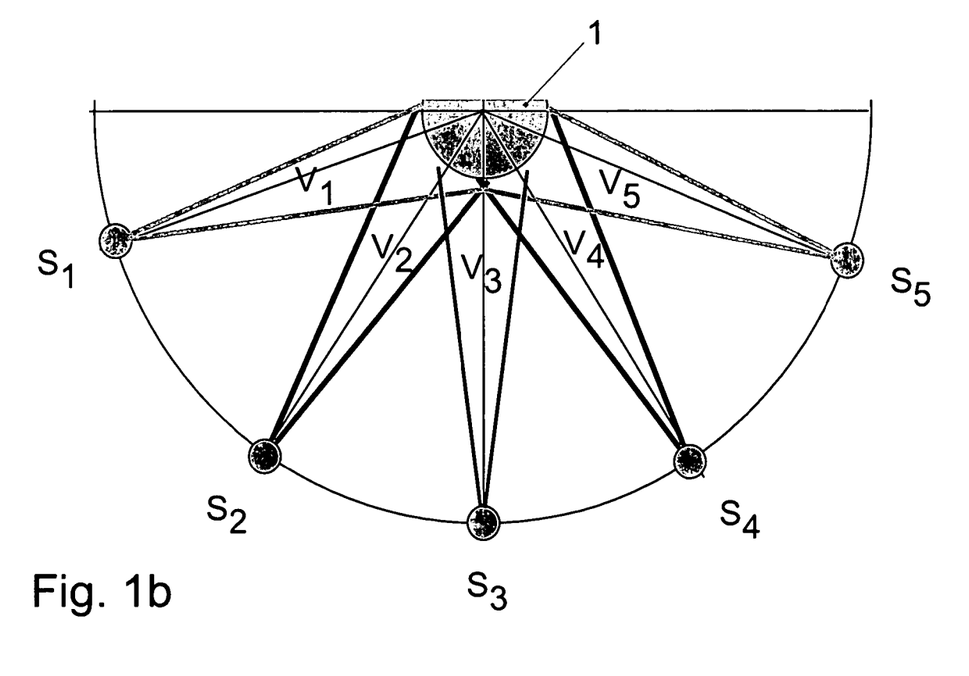

FIG. 1 shows a finger 1 in its partial figures a) and b), which is held into an arrangement according to the invention. The arrangement consists of five image receivers in the form of sensors $S_i$, (i=1 . . . 5), which are arranged in an arc-shaped manner and which are oriented to a common point approximately on the middle axis of the finger, and a control unit not depicted. The sensors $S_i$ are arranged on the arc in an angle of 36° to each other in relation to the middle axis of the finger. The sensors $S_i$ are automatically focusing imaging systems, but in FIG. 1 they are depicted merely in form of a CCD and a lens, respectively. However, CMOS or general imaging devices can be utilized.

Of the surface of the finger, a surface to be imaged 1.1 which extends from the first nail edge 1.2 across the finger-ball 1.4 to the second nail edge 1.3 shall be acquired. The fields of view $V_i$ of the sensors $S_i$ overlap each other. Thereby, each point of the surface to be imaged 1.1 is imaged by at least two sensors $S_i$ into a respective two-dimensional digital image 3. Next to the sensors $S_i$, light sources $L_k$, (k=1 . . . 6), are arranged, by which the finger 1 and, particularly, the surface to be imaged 1.1 is illuminatable.

Figure 2:
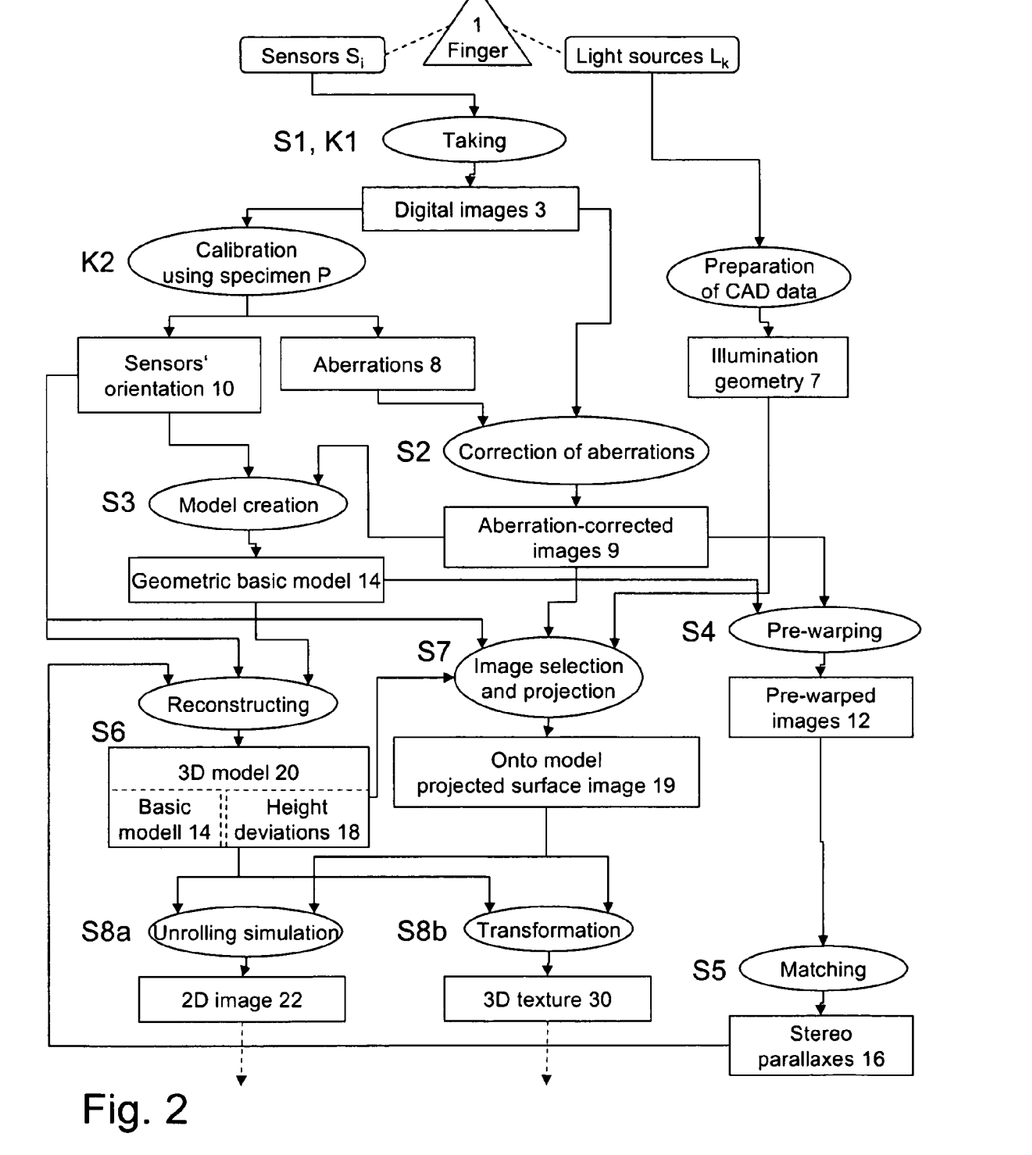
FIG. 2 shows a schema of the method according to the invention.

In FIG. 2, a schema of an embodiment of a method according to the invention for acquiring biometric data is illustrated. Ellipsoidal elements represent a step of the method; rectangular elements are the result after a respective step of the method.

During the regular operation, images of three sensors $S_i$ are repeatedly taken from different directions before the start of the actual process in order to detect the placing of a finger 1 in the arrangement. If a finger 1 is detected, its bearing in the taken images is analyzed and compared with a predefined nominal bearing. If the finger 1 is not placed correctly, requests for a correct placing including the necessary movements of the finger 1 are output.

In a step S1 or K1 respectively, the finger 1 is imaged using the sensors $S_i$, wherein digital images 3 are imaged by pairs in adjacent sensors $S_i$ and $S_{i+1}$, (t=1 . . . 4) at a time. During the taking of a pair of these digital images 3, the respective light source $L_{i+1}$ is switched on so that approximately orthogonal light incidence onto the surface to be imaged 1.1 takes place in the respective imaged area. For each digital image 3, the respective illumination situation is saved, which contains the information about which light sources $L_k$ are switched on during the respective taking and, if a light sources can emit different light wavelengths, the used wavelength of the light source $L_k$.

In order to geometrically calibrate the system, a defined specimen P which exhibits defined circular marks is imaged once into digital images 3 using the sensors $S_i$ in step K1 outside of the regular operation. In a calibration step K2, the inner and outer orientations 10 as well as the lens distortions of the sensors $S_i$, that are among all of the aberrations 8, are determined from these digital images 3 of the known specimen P. Other aberrations can be, for example, vignettings, color errors and error pixels. They can be determined from images of other specimens. From the aberrations 8 transformations are calculated which, if applied to recorded two-dimensional digital images 3, compensate the aberrations 8 contained in these digital images 3. Therewith, the calibration is completed. Besides, prepared data of the illumination geometry 7 concerning the position, the direction of emission and the emission cones of the light sources $L_k$ are available from the arrangement's CAD draft.

In step S2, each digital image 3 is aberration-corrected using the transformations determined in step K2. Subsequently, individually aberration-corrected images 9 are available. Only with them, analytic formulas can be reasonably used, which determine a 3D ray for each pixel from pixel coordinates and inner and outer orientations 10.

In step S3, geometric parameters according to a predefined geometric basic body are determined in order to obtain a geometric basic model 14 for the subsequent calculations. In the example shown in FIG. 6, the matter is about a solid of revolution with radii varying segmentally along the symmetry axis. From the silhouettes of the finger 1 in aberration-corrected images 9 from three different sensors $S_i$, the spatial bearing of the principal axis of the geometric basic model 14 as well as a rough preset for the radii of the solid of revolution depending on their position at this axis are determined. The geometric basic model 14 also obtains the description of a widely regular grid on the surface of the solid of revolution. In an advanced embodiment, the basic model 14 can solely consist of a surface grid to improve its accuracy. In this case, a solid of revolution is not necessary.

In step S4, the aberration-corrected images 9 are projected onto the geometric basic model 14. Thus, they become more similar to each other than they are originally. This essentially eases the matching between pairs of digital images 3 performed later on. The rays of every single pixel are intersected with the geometric basic model 14 for this purpose. For example, for a pair $9_i$, $9_{i+1}$ of aberration-corrected images from adjacent sensors $S_i$, $S_{i+1}$, this is carried out as follows: In the first image $9_i$ a rectangular region $R(9_i)$ is selected, which is located around the center of the projected overlapping area of the images $9_i$ and $9_{i+1}$ and which possesses a predefinable extent. For this region $R(9_i)$, the pre-warped images $12_i$ and, correspondingly, $12_{i+1}$ are created. Within the region $R(9_i)$, for both images $12_i$ and $12_{i+1}$ each image point of the geometric basic model 14 is transformed to 3D coordinates and projected into the aberration-corrected images $9_i$, $9_{i+1}$. The gray or color value located there or, respectively because normally non-integer coordinates are calculated, an interpolated value is put into the pre-warped images $12_i$ and $12_{i+1}$, respectively. Besides, the image coordinates of the projection into the aberration-corrected images $9_i$, $9_{i+1}$ are stored for a re-usage in order to save unnecessary calculation steps.

For this step of the method, only one image per sensor $S_i$ is necessary, which can be, on one hand, e.g. a linear combination of aberration-corrected images 9 from several different illumination situations or, on the other hand, a simple aberration-corrected image 9 of the sensor $S_i$ from a particular illumination. In the case of five sensors $S_i$, as a result there are five pre-warped images 12 available afterwards.

In step S5, the pre-warped images 12 are compared pair-wise to each other at all or at a great many points of two respective sensors $S_i$ in order to determine corresponding points. Reasonably, only the pre-warped images 12 from adjacent sensors $S_i$, $S_{i+1}$, are matched, so that this process is performed four times in case of five sensors $S_i$. As a result, for each adjacent pair of sensors $S_i$, $S_{i+1}$, two-dimensional stereo parallaxes 16 are available. These stereo parallaxes 16 represent for each pixel in the pre-warped image $12_i$ of the first sensor $S_i$ where to find the same point of the finger 1 in the pre-warped image $12_{i+1}$ of the second sensor $S_{i+1}$. In this step of the method, in particular the known HVFM method can be used, wherein each matching point is back-projected into the respective aberration-corrected images 9.

In step S6, height deviations between the geometric basic model 14 and the surface to be imaged 1.1 are determined. For every discrete point of the surface grid on the geometric basic model 14 it is checked in the thereto eligible stereo parallaxes 16 if there is an intersection of two corresponding rays along the surface normal in the center of the grid point. This step is known in the form of the "Locus" method. As a result, a three-dimensional model 20 in the form of the geometric basic model 14 with height deviations 18 is available, wherein each height deviation 18 is arranged in parallel with the respective surface normal at the center of a respective grid point of the surface grid.

In step S7, regarding the current object point, a selection of a best suited aberration-corrected image 9 out of the recorded combinations from sensors $S_i$ and illumination situations or, respectively, out of a selection of the best suited images with subsequent weighting is performed. As criteria, the line of vision of the respective ray to the surface normal, the difference to the respective angle of incidence of the illumination as well as, optionally, the distance between the respective sensor $S_i$ and the surface to be imaged 1.1. In doing so, the total reflection at the fingerprint ridges and the resolution are optimized. The pixel is projected from the selected aberration-corrected images 9 onto the reconstructed three-dimensional model 20 consisting of the geometric basic model 14 with height deviations 18. As a result of this step, a set of pixels assigned to the geometry of the three-dimensional model 20 is available as a part of the three-dimensional model 20. This set of pixels can be stored in the form of a two-dimensional surface texture with an array of texture coordinates assigned to it, for example. The combination of two-dimensional surface texture with the array of texture coordinates assigned to it can also be denoted as surface image 19 projected onto the three-dimensional model 20.

In an alternative embodiment, in step S6 the surface grid is determined so small meshed that the height deviations 18 do not only represent essential sample points of the surface to be imaged 1.1, but resolve the dermal ridges and the valleys between the dermal ridges. Step S7 can be omitted in such an embodiment. Such an embodiment allows a very precise three-dimensional model 20, but requires a high calculation effort.

It is possible to perform the stereoscopic analysis of the steps S6 and S7 only for partial areas of the surface to be imaged 1.1, for example only where overlapping images of adjacent sensors $S_i$, $S_{i+1}$ exhibit a high illumination quality and result in unique stereo parallaxes 16. To the rest of the surface of the three-dimensional model 20, the corresponding areas of aberration-corrected images 9 are monoscopically assigned. In such a case, at boundaries between areas that have been stereoscopically determined and areas that have been monoscopically determined, and at boundaries between different areas that have been monoscopically determined smooth transitions are advantageously created using weightings.

In order to obtain two-dimensional fingerprints compatible with traditional databases, in step S8a an unrolling of the three-dimensional model 20 on a plane area is simulated subsequently, whereby a two-dimensional image 22 is created which corresponds to the unrolling process in the traditional production of a fingerprint. In doing so, it is the matter of a mapping of the three-dimensional model's 20 surface texture onto the two-dimensional area of the fingerprint image 22. In a special embodiment, such a virtual unrolled fingerprint can be provided in a third dimension with height values corresponding to the dermal lines and valleys using gray levels or color values of the projected surface image 19, so that a topography of the surface to be imaged 1.1 become available. In an embodiment that can omit the projection of Step S7 because of a small meshed surface grid, the virtual unrolled fingerprint is solely calculated using a rotation of the basic model 14 with height deviations 18 along a plane area from the contact points with the plane area.

Real fingerprints with ink on paper exhibit dark areas where dermal ridges have touched the paper. Because optically recorded dermal ridges appear bright and the valleys between them appear dark, the virtual unrolled fingerprint is advantageously inverted before comparing it with a conventionally recorded, digitized fingerprint image.

Alternatively or additionally, in Step S8b the three-dimensional model 20, consisting of the geometric basic model 14 with height deviations 18 and the projected surface image 19, is transformed to a 3D texture 30 which can be processed and compared in further steps of the method. A 3D texture is a usually cuboidal representation of a set of points known from the field of computer graphics, wherein to each point of the set there are assigned three orthogonal coordinates as well as at least one intensity value. Two 3D textures can be compared directly, for example by correlation. According to the invention, a 3D texture can alternatively consist of a 3D surface description, for example a polygon grid, a grayscale or color image and information concerning an assignment between each image point and a related position on the 3D surface description.

In an alternative embodiment, a 3D texture 30 can be determined straightly instead of determining the projected surface image 19. A virtual unrolled fingerprint can be created from such a 3D texture, too.

Figure 3A:
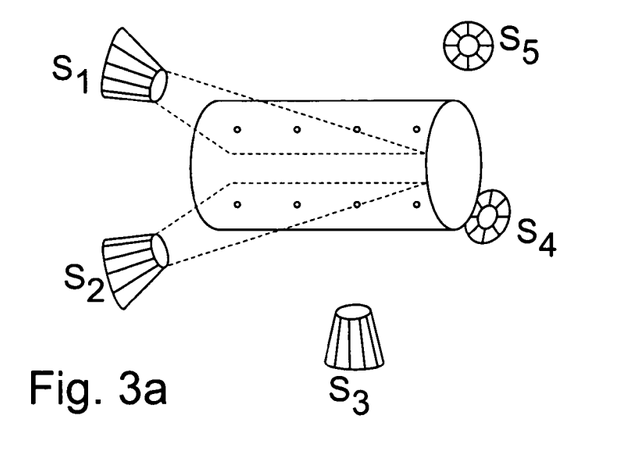
FIG. 3 shows a schematic representation of an arrangement with a specimen in a parallel perspective view.
Figure 3B:
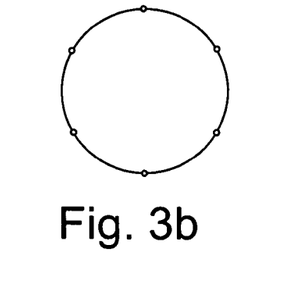

FIG. 3 shows in its partial figures a) and b) an arrangement comprising five sensors $S_i$. In between, a specimen P with defined marks M is placed. The marks are dark on a bright underground, but can also be provided to be bright on a dark underground. The midplanes $E_1$ and $E_2$ of the fields of view of the sensors $S_1$ and $S_2$ are depicted.

Figure 4:
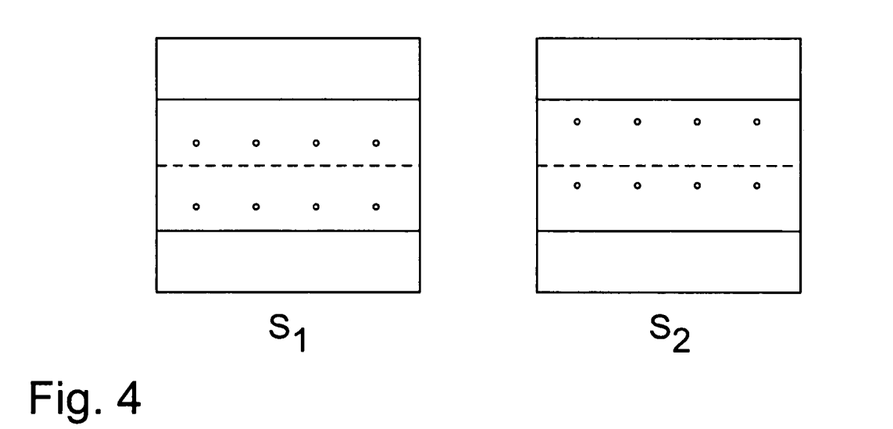
FIG. 4 shows two images of the specimen in two adjacent sensors.

In FIG. 4, the digital images 3 from the sensors $S_1$ and $S_2$ from the taking of the specimen P are illustrated.

Figure 5:
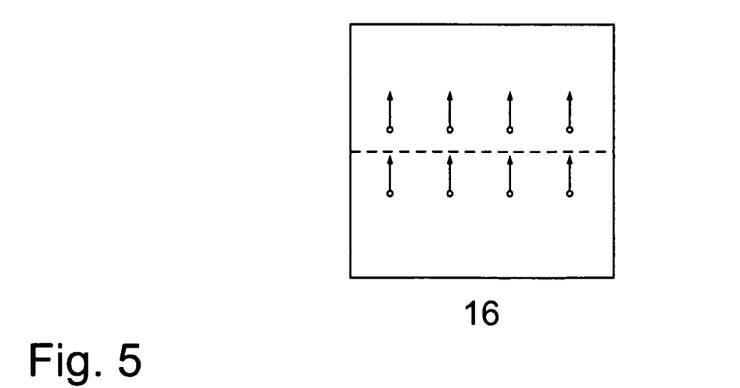
FIG. 5 shows the stereo parallaxes of the images from FIG. 4 schematically.

FIG. 5 shows the stereo-parallaxes 16 which have been determined from the digital images 3.

Figure 6A:
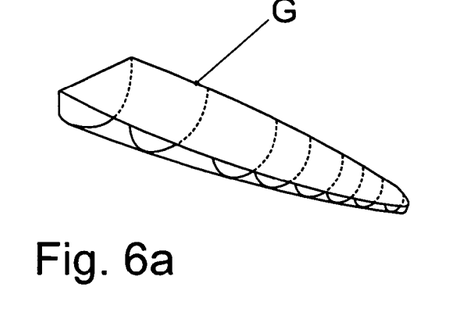
FIG. 6 shows a basic model of a finger, which is usable in the method, in a parallel perspective and a side view.
Figure 6B:
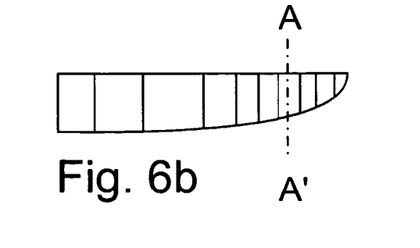

FIG. 6 illustrates in its partial figures a) and b) a basic body G in form of a solid of revolution with varying radii.

Figure 7:
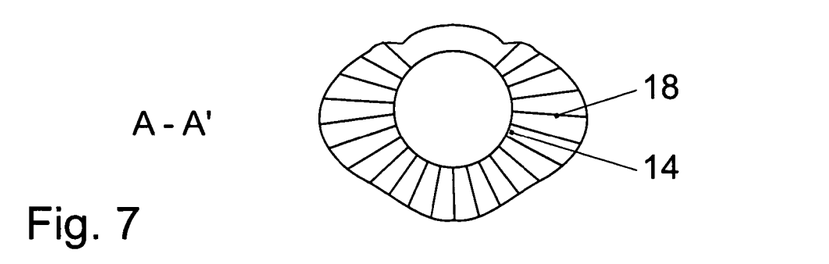
FIG. 7 shows a sectional view of a three-dimensional model including the determined height deviations of a finger from the basic model.

FIG. 7 show a sectional view of a geometric basic model 14, consisting of the basic body G, and height deviations 18 being surface normal thereto.

Figure 8:
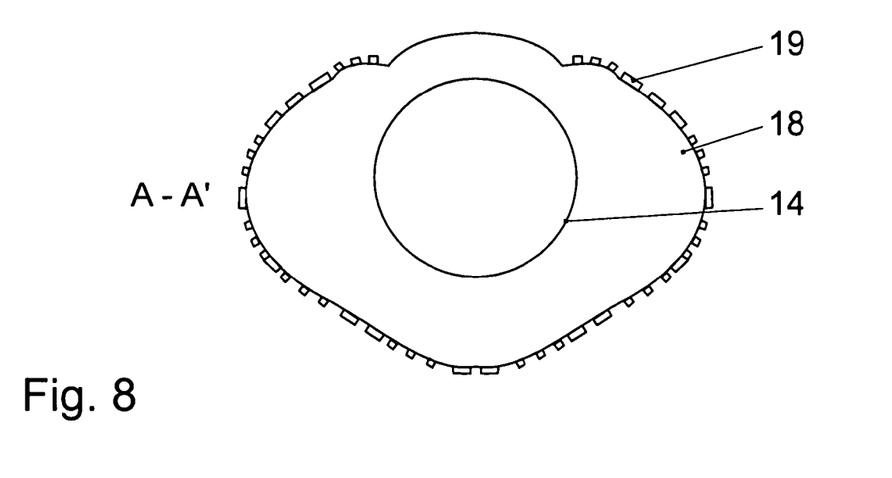
FIG. 8 shows a schematic representation of a grayscale image of the finger-ball being projected onto the three-dimensional model.

In FIG. 8, the three-dimensional model 20 with the projected surface image 19 is depicted in grayscale on the geometric basic model 14.

Figures 9, 10A:
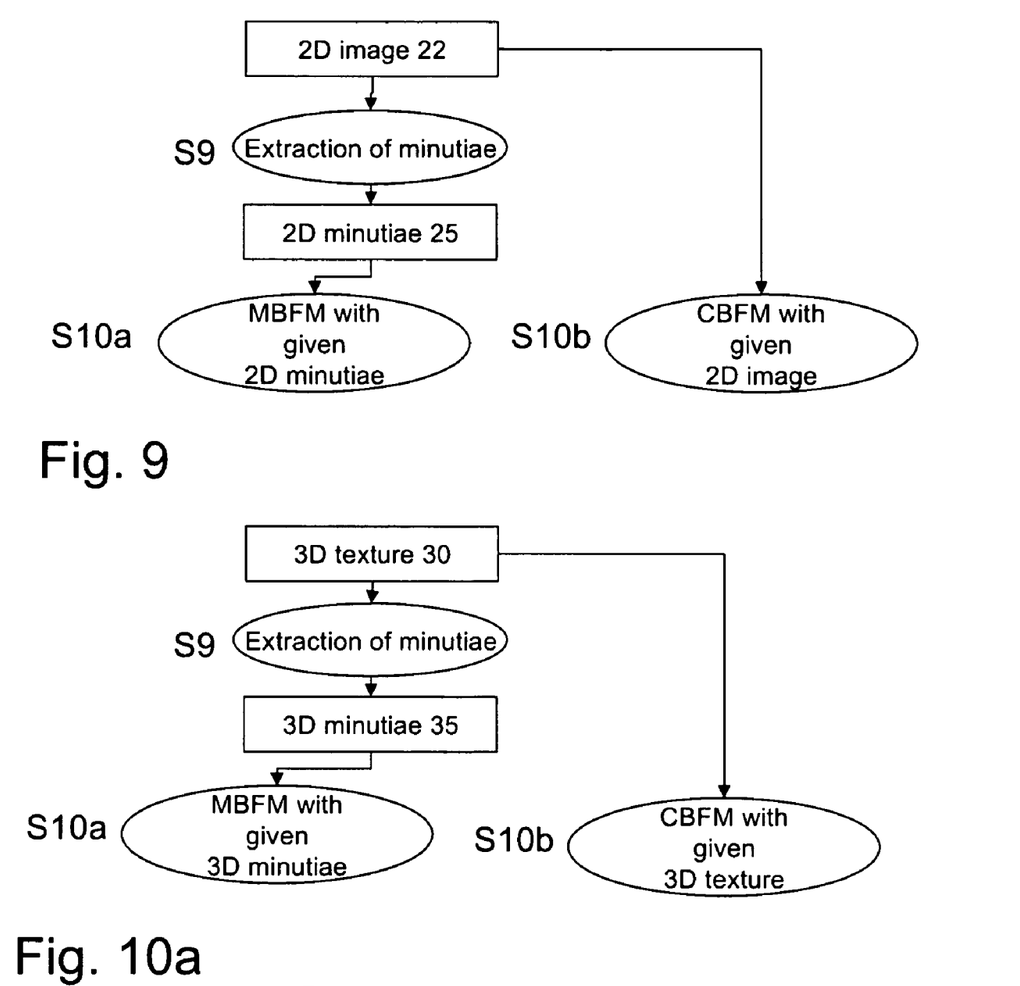
FIG. 9 shows a schema of the further course of the method to compare acquired characteristics in two dimensions.

In FIG. 9, further steps of the method are depicted for comparing acquired finger surfaces using correlation based fingerprint matching or minutiae based fingerprint matching respectively, wherein a conventional two-dimensional fingerprint is used in a digitized form as a subject of comparison. In the CBFM method, digital representations of the images of the fingerprints to be compared are correlated with each other in order to get an information about their similarity. In the MBFM method, initially a set of two-dimensionally classified minutiae 25 is extracted from the virtual unrolled fingerprint and is then compared to given two-dimensionally classified minutiae data.

Figure 10B:
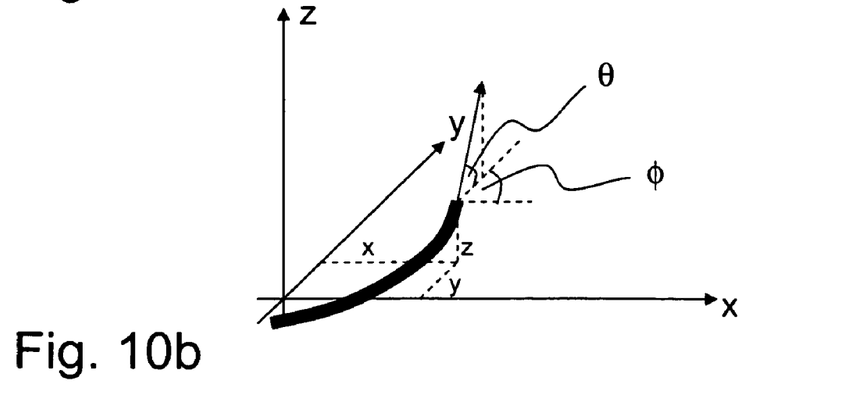
FIG. 10 shows a schema of the further course of the method to compare acquired characteristics in three dimensions and a definition of three-dimensionally classified minutiae.

An extension to the three-dimensional case is shown in FIG. 10 in partial figure a) in analogous steps of the method. A two-dimensionally classified minutia is usually described by attributes concerning its location (x/y) in the fingerprint, its angle of orientation θ its type and its significance. The type may be a ridge termination or a ridge bifurcation, for example. The significance is determined with the image quality of the fingerprint in the neighborhood of the minutia. This description can be extended to the three-dimensional case in an easy way. Partial figure b) shows the three-dimensional definition. A three-dimensionally classified minutia 35 correspondingly possesses attributes concerning its spatial location (x/y/z) in the three-dimensional model 20, its orientations θ und φ, its type and its significance. Because a three-dimensionally classified minutia 35 is oriented in space, two orientation angles θ und φ are necessary for a description.

A comparison based on a CBFM method is possible in three-dimensional space, too. For this purpose, 3D textures 30 of two fingerprints are compared. A 3D texture 30 can be calculated from the three-dimensional model 20 with little effort.

Figure 11:
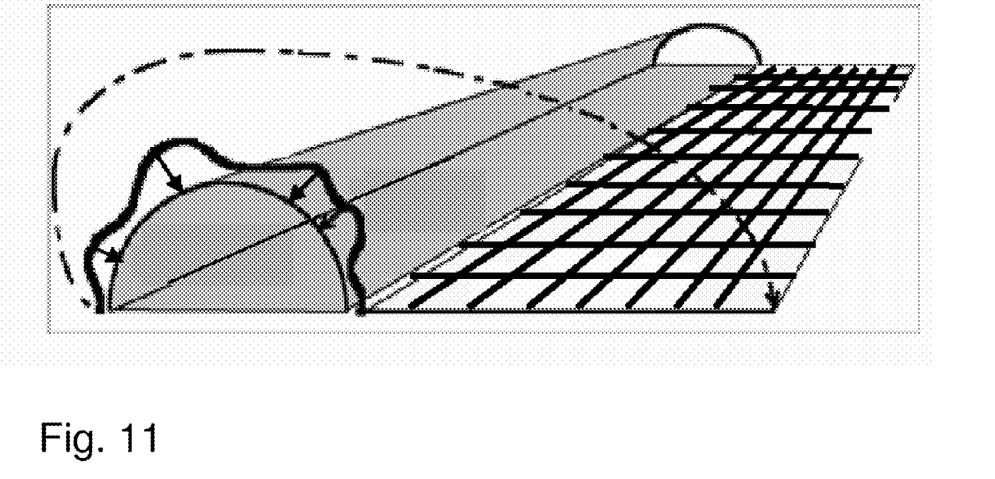
FIG. 11 shows a schematic representation of the unrolling simulation of a projection of the finger-ball's surface onto a profile body and by FIG. 12 shows an unrolled fingerprint including the entire finger-ball up to the nail edges as a result of the method.

As an example, FIG. 11 shows a half-cylindric profile body for the simulation of the unrolling movement as an orthogonal projection of the surface image 19 onto a curved surface whose coordinates are calculationally converted to a plane area. In more precise embodiments, an unrolling movement of the basic model 14 including the height deviations 18 is simulated for each point of the surface grid at the surface of the three-dimensional model 20. Thus, also distortions resulting from varying finger dimensions are taken into account correctly when creating the virtual unrolled fingerprint.

Figure 12:
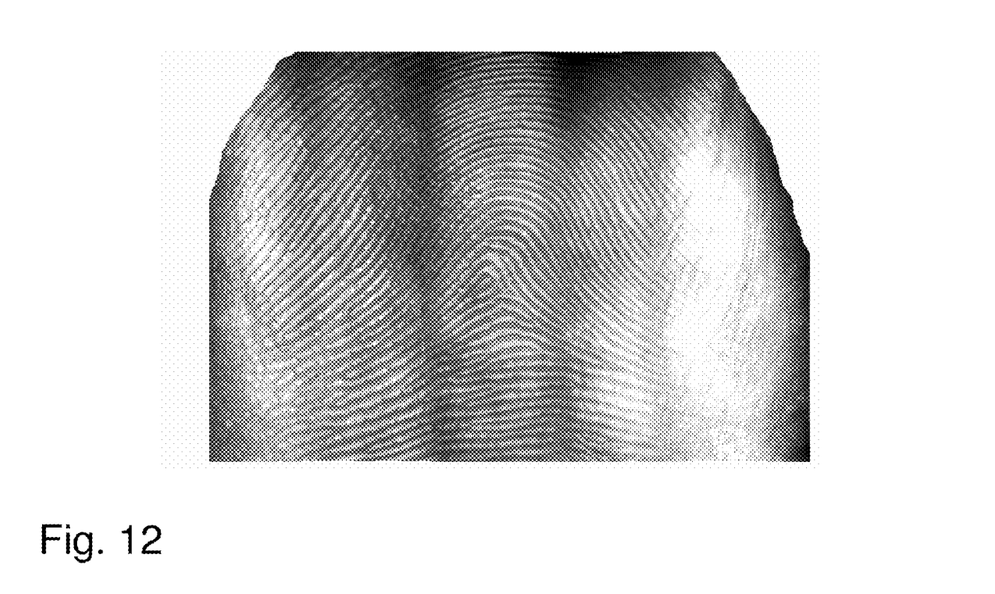

Finally, FIG. 12 shows a result of the unrolling simulation as an example.

Advantageously, when taking the digital images 3 in step S1 of the method, a series of simultaneous imagings is performed in several passes using different illumination situations. For example, three passes can be performed. In a first pass, digital images 3 are taken for determining a silhouette of the finger 1, from which the geometric basic model 14 is determined. In this first pass all light sources $L_k$ are switched on together and all sensors $S_i$ are triggered simultaneously. In a second pass, digital images 3 are taken for a stereoscopic analysis. Here, four sub-passes are performed, one for each pair of adjacent sensors $S_i$, $S_{i+1}$. In each sub-pass, the light source $L_k$ located between the respective pair of sensors thereby is switched on. In a third pass, five sub-passes are performed subsequently for the monoscopically assignment, one for each sensor $S_i$. In each sub-pass, the two light sources $L_i$, $L_{i+1}$, surrounding the respective sensor $S_i$ are switched on and the respective sensor $S_i$ is triggered.

It is possible to reduce the number of sub-passes in order to accelerate the method. For this purpose, for example, the sensors $S_1$ and $S_5$ and the light sources $L_1$, $L_2$, $L_5$, $L_6$ can be triggered and switched on together. This only results in a negligible influence to the image recording.

The steps of the method which create and/or compare three-dimensional classified minutiae and the three-dimensional texture can also be used independently from the method according to the invention with otherwise created three-dimensional images.

What is claimed is:

1. A method for acquiring biometric data of a finger having a nail and a finger-ball, the method using a control unit and comprising:

touchlessly and simultaneously imaging a surface to be imaged along at least three different directions so as to create at least three digital images, the surface to be imaged extending from a first nail edge, across the finger-ball, to a second nail edge, wherein each point of the surface to be imaged is imaged along at least two of the at least three different directions;

determining a geometric basic model for at least a part of the finger using at least one of at least three digital images;

geometrically pre-warping the at least three digital images using the geometric basic model so as to calculate at least three pre-warped images;

reconstructing a three-dimensional model of the surface to be imaged using a stereoscopic analysis of the at least three pre-warped images; and determining at least one finger characteristic using the three-dimensional model.

2. The method as recited in claim 1, wherein the three-dimensional model is reconstructed using the geometric basic model, and further comprising assigning at least one of a structure of dermal ridges and a surface texture of the surface to be imaged to the three-dimensional model.

3. The method as recited in claim 1, wherein the imaging of the surface to be imaged is performed using cameras, wherein aberrations of the cameras are calculationally corrected within the digital images.

4. The method as recited in claim 1, further comprising filtering each digital image in a shading correction, preserving a local contrast, and normalizing average intensities of the at least three digital images.

5. The method as recited in claim 1, wherein the stereoscopic analysis is performed by determining two-dimensional parallaxes from pair combinations of the pre-warped images.

6. The method as recited in claim 1, further comprising determining a rotation axis and segmentally varying radii along the rotation axis of a solid of revolution using silhouettes of the finger in at least two of the at least three digital images, and wherein the reconstructing of the three-dimensional model of the surface to be imaged is performed using at least a part of the solid of revolution.

7. The method as recited in claim 1, the reconstructing of the three-dimensional model includes determining height deviations between the geometric basic model of the finger and the finger, the height deviations being orthogonal to a local surface of the geometric basic model.

8. The method as recited in claim 7, wherein the reconstructing of the three-dimensional model includes projecting an aberration-corrected image of the surface to be imaged onto the geometric basic model corrected by the height deviations, wherein the aberration-corrected image includes at least one of an aberration-corrected grayscale, color, and multispectral image of the surface to be imaged.

9. The method as recited in claim 1, wherein each point on the surface to be image corresponds to a model image point in at least two of the at least three digital images.

10. The method as recited in claim 9, further comprising performing a selection out of the aberration-corrected images individually for each model image point, optimized for an extraction of minutiae, before the projecting onto the geometric basic model.

11. The method as recited in claim 10, wherein the selection out is performed using a surface normal at a respective point of the surface to be imaged, inner and outer orientations of image receivers, as well as positions, directions of emission and emission cones of light sources.

12. The method as recited in claim 10, wherein, before the selection, light sources that illuminate a surface pixel are weighted depending on an angle between an illuminating ray and a surface normal, wherein a large weight is assigned to aberration-corrected images that exhibit reflectingly incident light at the surface pixel and/or to aberration-corrected images whose direction of illumination and line of vision are in the vicinity of the normal surface.

13. The method as recited in claim 9, wherein several aberration-corrected images are projected onto the three-dimensional model, and the several projections are used in a weighted combination for each surface point or selection of surface points of the three-dimensional model.

14. The method as recited in claim 1, wherein the determining of the at least one finger characteristic is performed by creating a virtual unrolled fingerprint corresponding to the three-dimensional model.

15. The method as recited in claim 14, wherein the creating of the virtual unrolled fingerprint includes converting the three-dimensional model to a plane area by orthogonally projecting the three-dimensional model onto a profile body and assigning points of the profile body's surface to points of the plane area.

16. The method as recited in claim 1, further comprising creating a virtual unrolled fingerprint corresponding to the three-dimensional model and wherein the determining of the at least one finger characteristic includes deriving two-dimensionally classified minutiae from the virtual unrolled fingerprint.

17. The method as recited in claim 1, wherein the determining of the at least one finger characteristic includes creating a three-dimensional texture from the three-dimensional model.

18. The method as recited in claim 1, wherein the determining of the at least one finger characteristic includes deriving three-dimensionally classified minutiae from the three-dimensional model.

19. The method as recited in claim 1, further comprising illuminating the surface to be imaged using a plurality of different light sources or combinations thereof while performing several passes of imaging.

20. An arrangement for acquiring biometric data of a finger, comprising:
a system axis;
a surface to be imaged of the finger disposed at the system axis, the surface to be imaged extending from a first nail edge across a finger-ball to a second nail edge;
at least three image receivers disposed on a virtual arc around a system axis and each aiming toward the system axis in a corresponding direction, the at least three image receivers configured to image the surface to be imaged along the corresponding directions touchlessly into digital images, and configured to image each point of the surface to be imaged along at least two of the corresponding directions; and
a control unit usable to:
 a) simultaneously trigger the image receivers for taking the digital images;
 b) determine a geometric basic model for at least a part of the finger using at least one of the digital images;
 c) calculate pre-warped images by geometrically pre-warping the digital images using the geometric basic model;
 d) reconstruct a three-dimensional model of the surface to be imaged using a stereoscopic analysis of the pre-warped images; and
 e) determine at least one finger characteristic using the three-dimensional model.

21. The arrangement as recited in claim 20, wherein the control unit is configured to first record checking images by means of the image receivers and monitor a placing of the finger using the checking images and to perform the functions a) through e) solely in a case of a correct placing.

22. The arrangement as recited in claim 20, further comprising at least one light source disposed between each of the at least three image receiver and configured to at least partially illuminate the surface to be imaged, wherein the at least one light source is controllable independently.

23. The arrangement as recited in claim 22, wherein the at least one light source is disposed and controllable in such a way, that relevant boundary surfaces of dermal lines of the finger reflect the light emitted by the at least one light sources directly to a corresponding one of the light receivers.

* * * * *